United States Patent
Satake et al.

(10) Patent No.: US 10,008,878 B2
(45) Date of Patent: Jun. 26, 2018

(54) POWER CONTROL SYSTEM, POWER CONTROL DEVICE, AND METHOD FOR CONTROLLING POWER CONTROL SYSTEM

(71) Applicant: KYOCERA Corporation, Kyoto (JP)

(72) Inventors: Masaomi Satake, Yokohama (JP); Tetsuya Takenaka, Yamato (JP)

(73) Assignee: KYOCERA Corporation, Kyoto (JP)

( * ) Notice: Subject to any disclaimer, the term of this patent is extended or adjusted under 35 U.S.C. 154(b) by 255 days.

(21) Appl. No.: 14/785,616

(22) PCT Filed: Apr. 18, 2014

(86) PCT No.: PCT/JP2014/002213
§ 371 (c)(1),
(2) Date: Oct. 19, 2015

(87) PCT Pub. No.: WO2014/171153
PCT Pub. Date: Oct. 23, 2014

(65) Prior Publication Data
US 2016/0094087 A1    Mar. 31, 2016

(30) Foreign Application Priority Data
Apr. 19, 2013  (JP) .................................. 2013-088764

(51) Int. Cl.
*H02J 1/00* (2006.01)
*H02J 3/38* (2006.01)
(Continued)

(52) U.S. Cl.
CPC .............. *H02J 9/061* (2013.01); *H02J 3/383* (2013.01); *H02J 3/387* (2013.01); *H02J 7/0052* (2013.01);
(Continued)

(58) Field of Classification Search
CPC .......... H02J 9/061; H02J 3/387; H02J 7/0052; H02J 3/383; H02J 2003/388; H02J 3/381; Y02E 10/563
(Continued)

(56) References Cited

U.S. PATENT DOCUMENTS

| 2014/0152097 A1 | 6/2014 | Kitaji |
| 2014/0159491 A1 | 6/2014 | Kusunose |
| 2014/0203647 A1 | 7/2014 | Sato et al. |

FOREIGN PATENT DOCUMENTS

| JP | H09-051638 A | 2/1997 |
| JP | 2007-049770 A | 2/2007 |

(Continued)

OTHER PUBLICATIONS

Extended European search report (EESR) dated Nov. 11, 2016 issued by the European Patent Office for corresponding European Patent Application No. 14785236.2.
(Continued)

*Primary Examiner* — Richard Tan
(74) *Attorney, Agent, or Firm* — Procopio Cory Hargreaves and Savitch LLP

(57) ABSTRACT

This system can manage efficient operation control among distributed power sources without impairing their versatility. This power control system includes a power generation device (33) that generates power while a current sensor (40) detects forward power flow and another distributed power source (12), and a power control device (20) including an output unit (50) capable of outputting power from the other distributed power source (12) while the power generation device (33) and the other distributed power source (12) are disconnected from the grid. Output from the output unit (50)
(Continued)

allows supply of dummy current to the current sensor (40), the dummy current flowing in the same direction as the forward power flow.

11 Claims, 6 Drawing Sheets

(51) Int. Cl.
*H02J 9/00* (2006.01)
*H02J 9/06* (2006.01)
*H02J 7/00* (2006.01)

(52) U.S. Cl.
CPC ......... *H02J 3/381* (2013.01); *H02J 2003/388* (2013.01); *Y02E 10/563* (2013.01)

(58) Field of Classification Search
USPC ......................................................... 307/23
See application file for complete search history.

(56) References Cited

FOREIGN PATENT DOCUMENTS

| | | | |
|---|---|---|---|
| JP | 2008-253033 | A | 10/2008 |
| JP | 2011-188607 | A | 9/2011 |
| JP | 2012075216 | A | 4/2012 |
| JP | 2013027207 | A | 2/2013 |
| WO | 2008-041311 | A1 | 4/2008 |
| WO | 2011068133 | A1 | 6/2011 |
| WO | 2013015374 | A1 | 1/2013 |
| WO | 2013035224 | A1 | 3/2013 |

OTHER PUBLICATIONS

International Search Report dated May 27, 2014, issued for International Application No. PCT/JP2014/002213.
Written Opinion of the International Searching Authority issued by Japan Patent Office for International Application No. PCT/JP2014/002213.

POWER CONTROL SYSTEM, POWER CONTROL DEVICE, AND METHOD FOR CONTROLLING POWER CONTROL SYSTEM

CROSS-REFERENCE TO RELATED APPLICATION

This application claims priority to and the benefit of Japanese Patent Application No. 2013-088764 filed Apr. 19, 2013, the entire contents of which are incorporated herein by reference.

TECHNICAL FIELD

This disclosure relates to a power control system, a power control device, and a method for controlling a power control system.

BACKGROUND

As a power control device for power generation in a power generation system that includes power generating equipment, such as a photovoltaic panel or the like, known devices allow grid interconnected operation that outputs AC power while interconnected with a commercial power grid (abbreviated below as "grid" as appropriate) and independent operation that outputs AC power irrespective of the grid.

Also, as a power control device for power storing in a power storing system that includes power storing equipment, such as a storage cell or the like that is charged by the power grid, known devices allow grid interconnected operation that outputs AC power while interconnected with the grid and independent operation that outputs AC power irrespective of the grid, like the above-described power control device for power generation.

SUMMARY

Technical Problem

Power control systems are required to integrally manage and operate a plurality of distributed power sources, such as photovoltaic cells, storage cells, fuel cells, gas powered generators, and the like. There is particular demand for the construction of a system that can manage efficient operation control among a plurality of distributed power sources without impairing the versatility of the distributed power sources.

It would therefore be helpful to provide a power control system, a power control device, and a method for controlling a power control system that can manage efficient operation control among a plurality of distributed power sources without impairing the versatility of the distributed power sources.

Solution to Problem

In order to solve the above problem, a disclosed power control system includes:
a power generation device that generates power while a current sensor detects forward power flow and another distributed power source; and
a power control device including an output unit capable of outputting power from the other distributed power source while the power generation device and the other distributed power source are disconnected from a grid, wherein
output from the output unit allows supply of dummy current to the current sensor, the dummy current flowing in a same direction as the forward power flow.

The power control system may further include a synchronous switch configured to switch synchronously with connection to and disconnection from the grid, wherein the synchronous switch passes the dummy current when disconnected from the grid and does not pass the dummy current when connected to the grid.

The power control system may further include an independent operation switch configured to turn off during interconnected operation and turn on during independent operation via the distributed power source, wherein the independent operation switch is disposed between the power generation device and the other distributed power source.

The other distributed power source may be a storage cell capable of charging with power from the power generation device when the independent operation switch is on.

The power control system may further include a dummy current control switch configured to suspend the dummy current upon completion of the charging of the storage cell.

The current sensor may be disposed at a location through which current due to power generation by the power generation device during independent operation does not flow.

In order to solve the above problem, a disclosed power control device is used in a power control system that includes a power generation device that generates power while a current sensor detects forward power flow and another distributed power source, the power control device including:
an output unit capable of outputting power from the other distributed power source while the power generation device and the other distributed power source are disconnected from a grid, wherein
output from the output unit allows supply of dummy current to the current sensor, the dummy current flowing in a same direction as the forward power flow.

In order to solve the above problem, a disclosed method is for controlling a power control system that includes a power generation device that generates power while a current sensor detects forward power flow and another distributed power source, the method including:
outputting power from the other distributed power source while the power generation device and the other distributed power source are disconnected from a grid; and
supplying dummy current to the current sensor via power from the other distributed power source, the dummy current flowing in a same direction as the forward power flow.

Advantageous Effect

According to this power control system, power control device, and method for controlling a power control system, it is possible to manage efficient operation control among a plurality of distributed power sources without impairing the versatility of the distributed power sources.

BRIEF DESCRIPTION OF THE DRAWINGS

In the accompanying drawings.

DETAILED DESCRIPTION

With reference to the drawings, the following describes the disclosed embodiments in detail.

Embodiment

First, a power control system according to one of the disclosed embodiments is described. In addition to power supplied by the grid (commercial power grid), the power control system of this embodiment includes a distributed power source that supplies sellable power and/or a distributed power source that supplies unsellable power. The distributed power source that supplies sellable power is, for example, a system that supplies power by photovoltaic power generation or the like. On the other hand, the distributed power source that supplies unsellable power is, for example, a storage cell system that can charge and discharge power, a fuel cell system that includes a fuel cell such as a Solid Oxide Fuel Cell (SOFC), a gas powered generator system that generates power with gas fuel, or the like. This embodiment illustrates an example of providing a photovoltaic cell as a distributed power source that supplies sellable power and providing a storage cell and a power generation device, which is a fuel cell or a gas powered generator, as distributed power sources that supply unsellable power.

Figure 1:
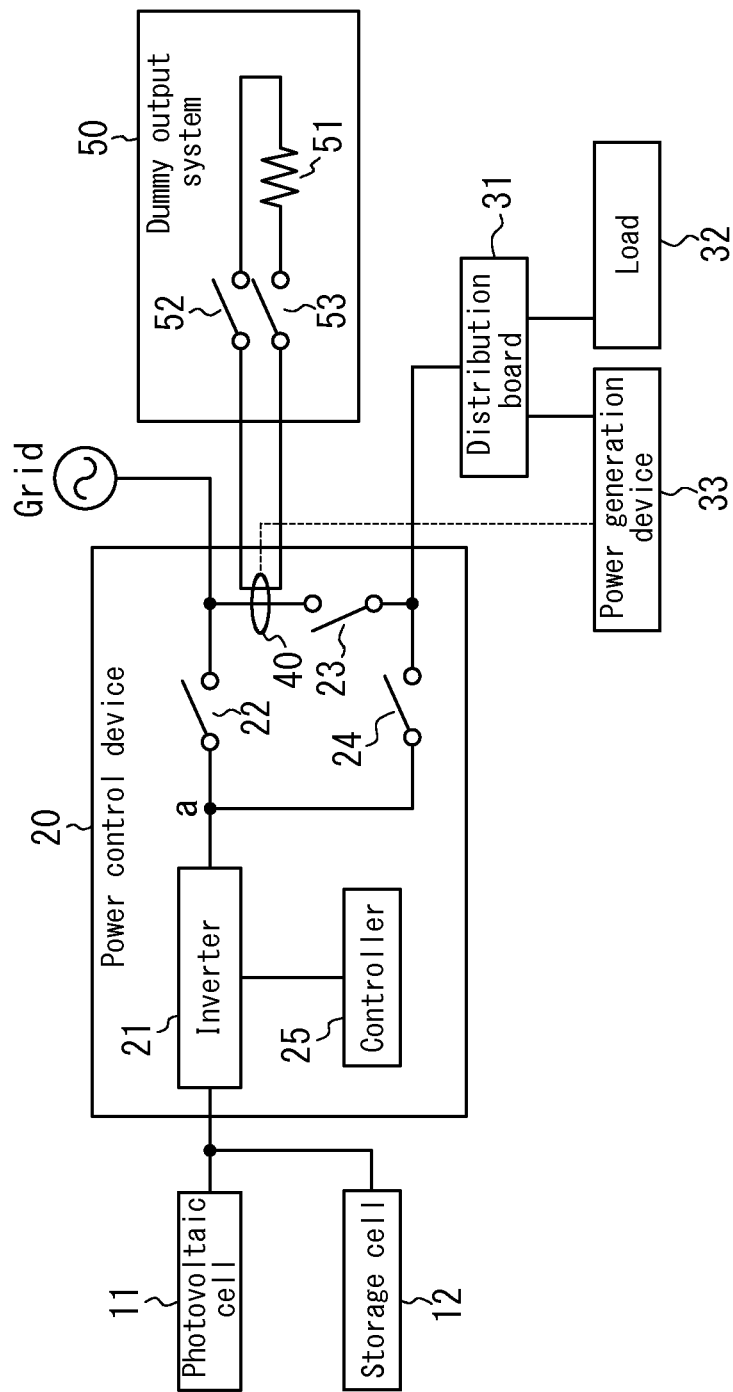
FIG. 1 is a block diagram of a power control system according to one of the disclosed embodiments.

FIG. 1 is a block diagram schematically illustrating the structure of a power control system according to one of the disclosed embodiments. The power control system of this embodiment includes a photovoltaic cell 11, storage cell 12, power control device 20 (power control device), distribution board 31, load 32, power generation device 33, current sensor 40, and dummy output system 50 (output unit). The power generation device 33 is configured with a fuel cell or gas powered generator. The power control system normally performs interconnected operation with the grid and supplies power supplied by the grid and power from the distributed power sources (photovoltaic cell 11, storage cell 12, and power generation device 33) to the load 32. When there is no power supply from the grid, such as during a power outage, the power control system performs independent operation and supplies power from the distributed power sources (photovoltaic cell 11, storage cell 12, and power generation device 33) to each load (load 32, dummy current load 51). When the power control system performs independent operation, the distributed power sources (photovoltaic cell 11, storage cell 12, and power generation device 33) are disconnected from the grid. When the power control system performs interconnected operation, the distributed power sources (photovoltaic cell 11, storage cell 12, and power generation device 33) are connected to the grid.

In FIG. 1, the solid lines connecting functional blocks represent wiring through which power flows, and the dashed line connecting functional blocks represents the flow of control signals or of communicated information. The communication indicated by the dashed line may be wired communication or wireless communication. A variety of methods, including a hierarchical structure, may be employed for control signals and communication of information. For example, a short distance communication method such as ZigBee® or the like may be used. Furthermore, a variety of transmission media may be used, such as infrared communication, Power Line Communication (PLC), or the like. Above the lower layers that include the physical layers appropriate for each type of communication, a variety of communication protocols prescribed only for logical layers, such as ZigBee SEP2.0 (Smart Energy Profile 2.0), ECHONET Lite®, or the like, may be used.

The photovoltaic cell 11 converts photovoltaic energy into DC power. In the photovoltaic cell 11, for example power generation units that have a photoelectric conversion cell are connected in a matrix and output a predetermined short-circuit current (for example, 10 A). The photovoltaic cell 11 may be of any type capable of photoelectric conversion, such as a silicon-based polycrystalline photovoltaic cell, a silicon-based monocrystalline photovoltaic cell, a CIGS or other thin-film photovoltaic cell, or the like.

The storage cell 12 is configured with a storage cell such as a lithium-ion cell, a nickel-hydrogen cell, or the like. The storage cell 12 can supply power by discharging the power charged in the storage cell 12. In addition to the power supplied by the grid and the photovoltaic cell 11, the storage cell 12 can also be charged with power supplied by the power generation device 33, as described below.

The power control device 20 converts the DC power supplied by the photovoltaic cell 11 and the storage cell 12 and the AC power supplied by the grid and the power generation device 33 and also performs control to switch between interconnected operation and independent operation. The power control device 20 includes an inverter 21, interconnected operation switches 22 and 23, an independent operation switch 24, and a controller 25 that controls the entire power control device 20. The interconnected operation switch 23 may be configured to be outside the power control device 20.

The inverter 21 is a two-way inverter that converts the DC power supplied by the photovoltaic cell 11 and the storage cell 12 into AC power and converts the AC power supplied by the grid and the power generation device 33 into DC power. A converter may also be provided at a stage prior to the inverter 21 to raise the voltage of the DC power from the photovoltaic cell 11 and the storage cell 12 to a certain voltage.

The interconnected operation switches 22 and 23 and the independent operation switch 24 are configured with relays, transistors, and the like and are controlled to be on or off. As illustrated, the independent operation switch 24 is provided between the power generation device 33 and the storage cell 12. The interconnected operation switches 22 and 23 and the independent operation switch 24 are switched in synchronization so that both are not on (or off) simultaneously. In greater detail, when the interconnected operation switches 22 and 23 are on, the independent operation switch 24 is synchronously off, and when the interconnected operation switches 22 and 23 are off, the independent operation switch 24 is synchronously on.

Synchronous control of the interconnected operation switches 22 and 23 and the independent operation switch 24 is implemented with hardware by having the wiring for the control signal to the interconnected operation switches 22 and 23 branch to the independent operation switch 24. For each switch, the on and off states may of course be set separately for the same control signal. The synchronization control of the interconnected operation switches 22 and 23 and the independent operation switch 24 may also be implemented with software by the controller 25.

The controller 25 is, for example, configured with a microcomputer and controls operations of the inverter 21, interconnected operation switches 22 and 23, independent operation switch 24, and the like based on conditions such as an increase in grid voltage, a power outage, or the like. During interconnected operation, the controller 25 switches the interconnected operation switches 22 and 23 on and the independent operation switch 24 off. During independent operation, the controller 25 switches the interconnected operation switches 22 and 23 off and the independent operation switch 24 on.

During interconnected operation, the distribution board 31 divides power supplied by the grid into a plurality of branches for distribution to the load 32. The distribution board 31 also divides power supplied by the plurality of distributed power sources (photovoltaic cell 11, storage cell 12, and power generation device 33) into a plurality of branches for distribution to the load 32. The load 32 is a power load that consumes power. Examples include electrical appliances used in the home, such as an air conditioner, microwave oven, or television; machines and lighting used in industrial and commercial facilities, such as air conditioning equipment, lighting fixtures, and the like.

The power generation device 33 is configured with a fuel cell or gas powered generator. The fuel cell includes a cell that uses hydrogen to generate DC power via a chemical reaction with oxygen in the air, an inverter that converts the generated DC power into 100 V or 200 V AC power, and auxiliary components. Here, the fuel cell that is the power generation device 33 is a system that can provide AC power to the load 32 without passing through the power control device 20. Accordingly, the fuel cell is not necessarily designed by assuming connection with the power control device 20 and may be a versatile system. The gas powered generator generates power with an engine that uses a predetermined gas or the like as fuel.

The power generation device 33 generates power while the corresponding current sensor 40 detects forward power flow (current in the power buying direction), and when generating power, performs a load following operation to follow the power consumption of the load 32 or a rated operation at a predetermined rated power. The load following range during the load following operation is, for example, 200 W to 700 W, and the rated power during rated operation is, for example, 700 W. The power generation device 33 may perform a load following operation to follow the power consumption of the load 32 during interconnected operation and perform a load following operation or a rated operation at a rated power during independent operation.

The current sensor 40 detects current flowing between the grid and the power generation device 33. In Japan, power generated by the power generation device 33 is prescribed as being unsellable. Therefore, when the current sensor 40 detects reverse power flow (current in the power selling direction), the power generation device 33 stops generating power. While the current sensor 40 detects forward power flow, the power generation device 33 can supply its own power to the load 32 and generates power by a load following operation or a rated operation. As described below, from the perspective of power consumption, the current sensor 40 is preferably disposed in the power control device 20 at a location through which current due to power generation by the power generation device 33 during independent operation does not flow.

In a state in which the power generation device 33 and the storage cell 12 are disconnected from the grid, the power control system of this embodiment passes a current (dummy current) in the same direction as the forward power flow through the current sensor 40 via the dummy output system 50. It thus becomes possible to cause the power generation device 33 to perform a rated operation and to store the power generated by the power generation device 33 in the storage cell 12. The following describes power storage via dummy current through the dummy output system 50 in detail.

Figure 2:
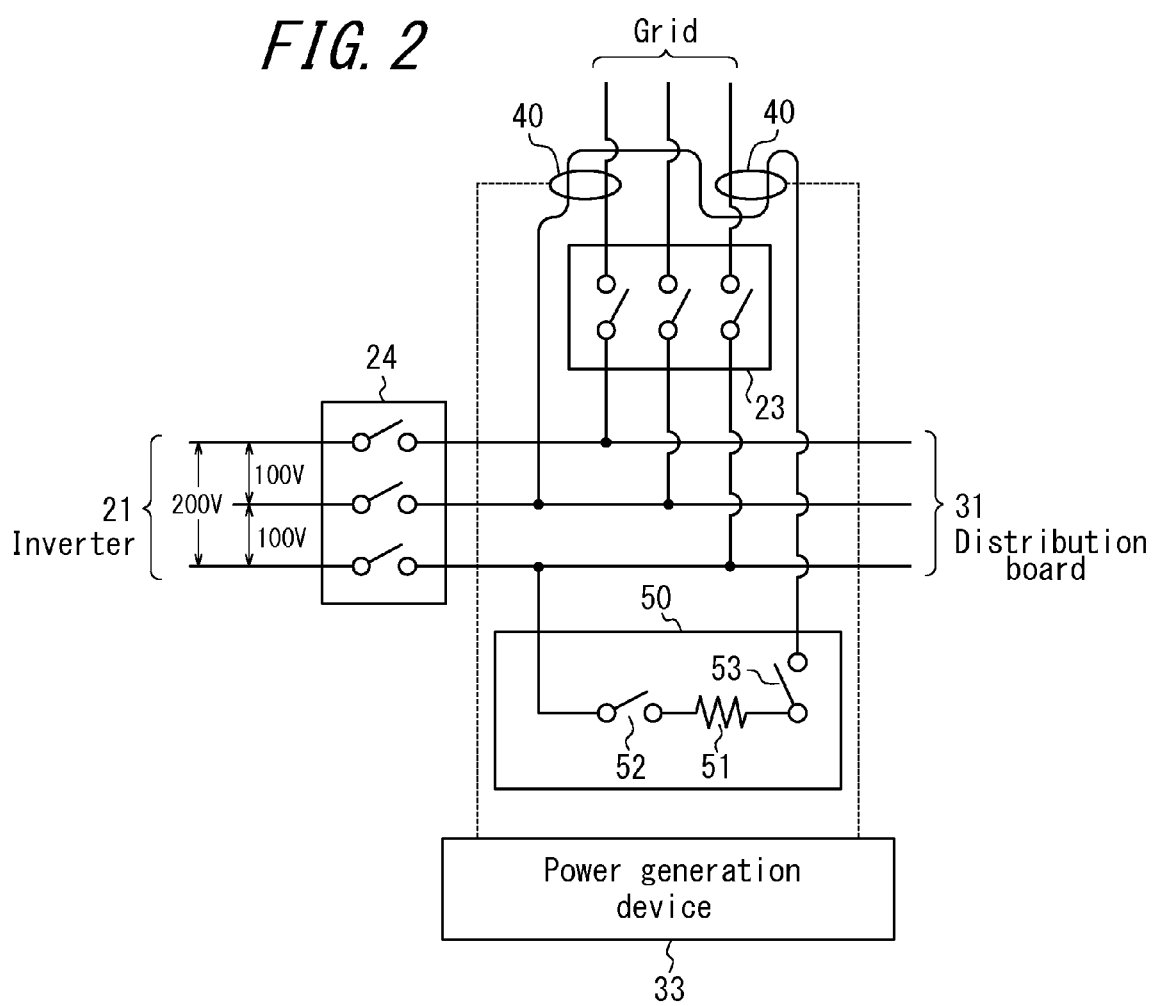
FIG. 2 illustrates wiring related to a dummy output system.

The dummy output system 50 (output unit) can provide dummy current that flows in the same direction as the forward power flow to the current sensor 40. The dummy output system 50 is a system that receives power supplied by the power control device 20 and includes the dummy current load 51, a synchronous switch 52, and a dummy current control switch 53. FIG. 2 illustrates wiring related to the dummy output system 50. In FIG. 2, the grid is a 200 V, single-phase three-wire system. In this case, one of the voltage wires and the neutral wire are connected to the dummy output system 50. As illustrated, the wire connected to the dummy output system 50 passes through the current sensor 40 that is disposed at each of the two voltage lines. The dummy output system 50 may be configured integrally with the power control device 20 or may be configured independently from the power control device 20.

The dummy current load 51 is a load provided as appropriate for adjusting the current in the dummy output system 50. A load external to the dummy output system 50 may be used as the dummy current load 51. The synchronous switch 52 is for providing a portion of the power, provided to the dummy output system 50 by the power control device 20, to the current sensor 40 as dummy current in the same direction as the forward power flow. The dummy current control switch 53 is for preventing unnecessary power generation due to the dummy current. The synchronous switch 52 and the dummy current control switch 53 are configured with independent relays, transistors, and the like and are independently controlled to be on or off by the controller 25 of the power control device 20.

The synchronous switch 52 is controlled to be on or off in synchronization with the independent operation switch 24 of the power control device 20. In other words, like the independent operation switch 24, the synchronous switch 52 turns off during interconnected operation and turns on during independent operation. In greater detail, the synchronous switch 52 is switched synchronously with connection to and disconnection from the grid. The synchronous switch 52 passes dummy current when disconnected from the grid and does not pass dummy current when connected to the grid. Synchronous control of the independent operation switch 24 and the synchronous switch 52 is implemented with hardware by having the wiring for the control signal to the independent operation switch 24 branch to the synchronous switch 52. The synchronization control of the independent operation switch 24 and the synchronous switch 52 may also be implemented with software by the controller 25.

The dummy current control switch 53 turns off when charging of the storage cell 12 is complete and turns on when charging is not complete. Completion of charging of the storage cell 12 refers to the case of a predetermined level or more of power being charged in the storage cell 12. The controller 25 may be configured to determine whether charging is complete via communication with the storage cell 12. When charging of the storage cell 12 is complete during independent operation and the dummy current control switch 53 turns off, the dummy current stops flowing through the current sensor 40. Hence, unnecessary power generation by the power generation device 33 can be suspended.

The following describes an example of control in the power control system according to this embodiment in detail.

Figure 3:
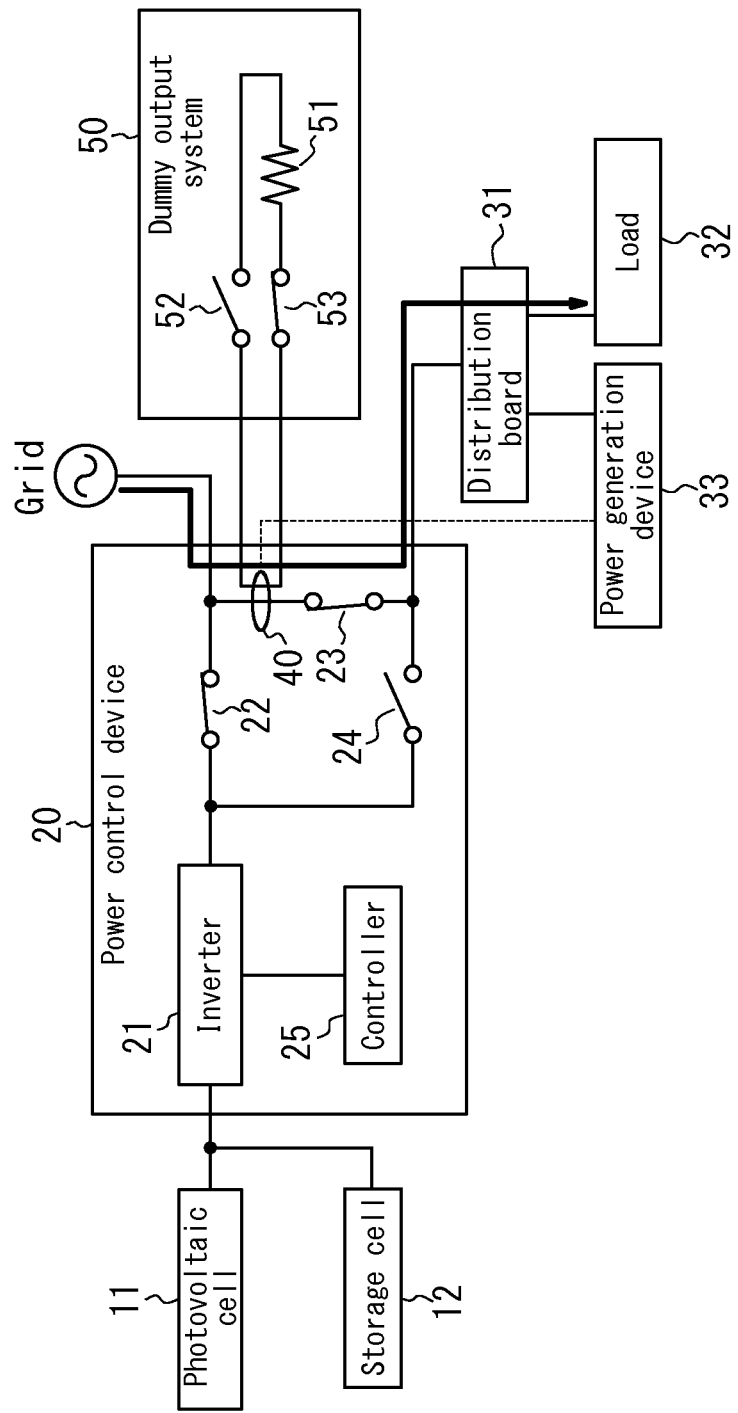
FIG. 3 illustrates an example of control in the power control system during interconnected operation.

FIG. 3 illustrates an example of control in the power control system during interconnected operation. In this case, the switches in the power control device 20 are controlled so that the interconnected operation switches 22 and 23 are on, and the independent operation switch 24 is off. The switches in the dummy output system 50 are controlled so that the synchronous switch 52 is off and the dummy current control switch 53 is either on or off in accordance with the charging level of the storage cell 12.

During interconnected operation, as indicated by the bold arrow, AC power at 100 V (or 200 V) is supplied by the grid and fed to the load 32. When charging of the storage cell 12 is not complete, the power control device 20 converts the AC power from the grid to DC power and charges the storage cell 12. The power control device 20 can convert the power generated by the photovoltaic cell 11 into AC power and send the AC power to the grid by reverse power flow and can also sell surplus power. The power control device 20 includes a structure that can output power from the grid and power of the distributed power sources (photovoltaic cell 11 and storage cell 12) to the dummy output system 50, but since the synchronous switch 52 is off during interconnected operation, dummy current is not supplied to the current sensor 40. Forward power flow from the grid (current in the power buying direction) flows into the current sensor 40, and therefore, the power generation device 33 generates power and supplies the power to the load 32 through the distribution board 31.

Figure 4:
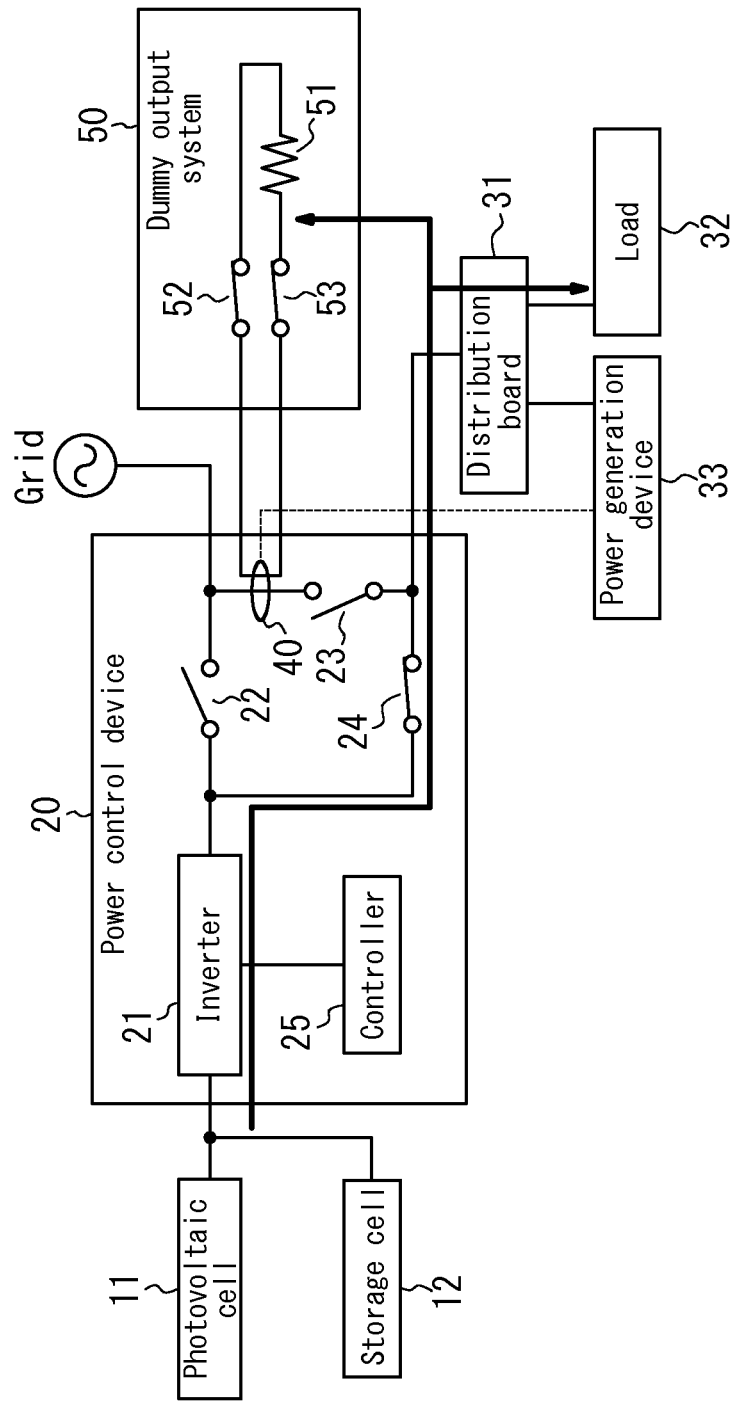
FIG. 4 illustrates an example of control in the power control system during independent operation.
Figure 5:
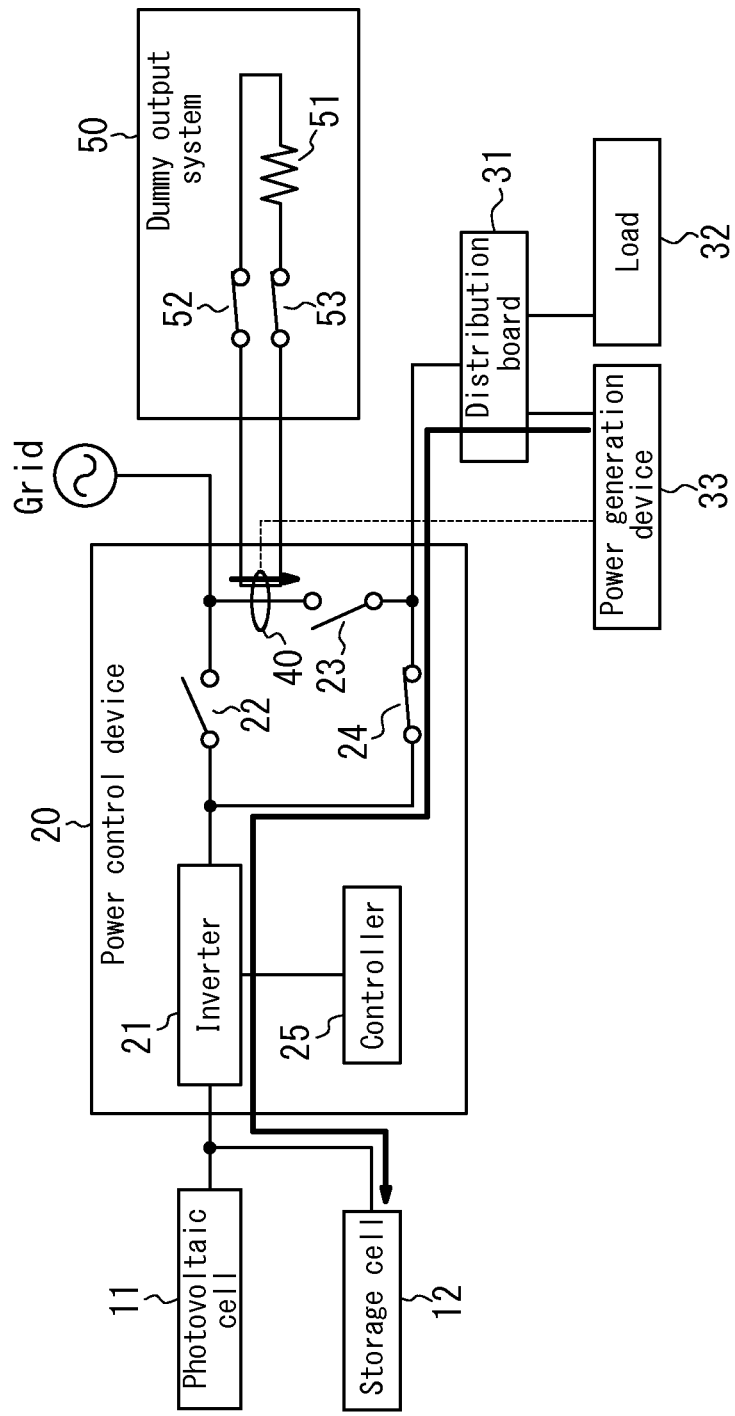
FIG. 5 illustrates an example of control in the power control system during independent operation.

Next, examples of control in the power control system during independent operation are described with reference to FIGS. 4 and 5. In FIGS. 4 and 5, it is assumed that charging of the storage cell 12 is not complete. In this case, the switches in the power control device 20 are controlled so that the interconnected operation switches 22 and 23 are off, and the independent operation switch 24 is on. The switches in the dummy output system 50 are controlled so that the synchronous switch 52 is on and the dummy current control switch 53 is on.

FIG. 4 illustrates power supply by the distributed power sources during independent operation. During independent operation, the power of the distributed power sources (photovoltaic cell 11 and storage cell 12) is output by the power control device 20 to the load 32 and the dummy output system 50 via the independent operation switch 24.

FIG. 5 illustrates power generation by the power generation device 33 due to dummy current during independent operation. As illustrated in FIG. 4, during independent operation, power is supplied to the dummy output system 50 by the power control device 20. In this embodiment, a portion of the power supplied to the dummy output system 50 by the power control device 20 is supplied to the current sensor 40 as dummy current. At this time, since the current sensor 40 detects forward power flow (current in the power buying direction), the power generation device 33 generates power with a load following operation or a rated operation. The distribution board 31 supplies the power generated by the power generation device 33 to the load 32 and supplies surplus power that exceeds the power consumed by the load 32 to the power control device 20. In the power control device 20, the surplus power passes through the independent operation switch 24 and is converted to DC power by the inverter 21. The result is then fed to the storage cell 12.

According to this embodiment, the power control device 20 thus includes the dummy output system 50 that, while the power generation device 33 and other distributed power sources (photovoltaic cell 11 and storage cell 12) are disconnected from the grid, can output power from the other distributed power sources. Via output of the dummy output system 50, the power control device 20 can provide dummy current that flows in the same direction as the forward power flow to the current sensor 40. As a result, it is possible to manage efficient operation control among a plurality of distributed power sources without impairing the versatility of the distributed power sources. In greater detail, during independent operation, the power generation device 33 can be caused to generate power by passing dummy current to the current sensor 40. Since power generation by the power generation device 33 is controlled using dummy current to the current sensor 40, this embodiment also offers the advantage that a general-purpose fuel cell system and gas power generation system may be used without the need to make any special changes to the power generation device 33 itself.

According to this embodiment, the synchronous switch 52 is switched synchronously with connection to and disconnection from the grid. The synchronous switch 52 passes dummy current when disconnected from the grid and does not pass dummy current when connected to the grid. As a result, dummy current flows to the current sensor 40 during independent operation in which the system is disconnected from the grid, whereas dummy current does not flow to the current sensor 40 during interconnected operation in which the system is connected to the grid, so that reverse power flow from the power generation device 33 does not mistakenly occur.

According to this embodiment, the independent operation switch 24 turns off during interconnected operation and turns on during independent operation via the distributed power sources. Furthermore, the independent operation switch 24 is disposed between the power generation device 33 and the other distributed power sources (photovoltaic cell 11 and storage cell 12). As a result, during independent operation, the power generated by the power generation device 33 can be supplied to the other distributed power sources via the independent operation switch 24.

Furthermore, the storage cell 12 can charge with power from the power generation device 33 when the independent operation switch 24 is turned on. As a result, during independent operation, surplus power that is power generated by the power generation device 33 and that exceeds the power consumption by the load 32, for example, can be stored in the storage cell 12.

Figure 6:
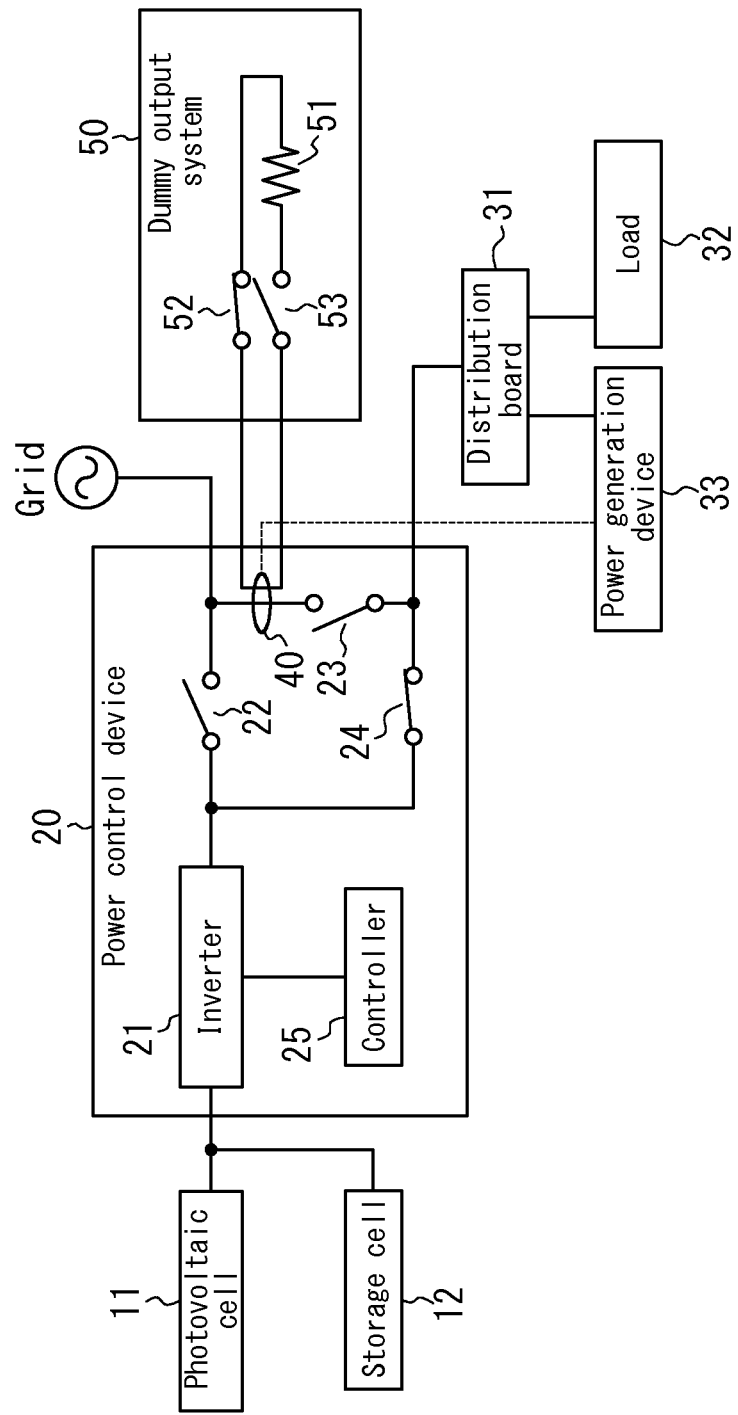
FIG. 6 illustrates an example of control in the power control system during independent operation (when the storage cell is completely charged).

FIG. 6 illustrates an example of control in the power control system during independent operation when the storage cell 12 is completely charged. In this case, the switches in the power control device 20 are controlled so that the interconnected operation switches 22 and 23 are off, and the independent operation switch 24 is on. The switches in the dummy output system are controlled so that the synchronous switch 52 is on and the dummy current control switch 53 is off.

When charging of the storage cell 12 is complete, the dummy current control switch 53 turns off. Therefore, during independent operation, it is not that case that a portion of the power supplied to the dummy output system 50 via the power control device 20 is supplied to the current sensor 40 as dummy current. Forward power flow from the grid and dummy current are thus no longer detected in the current sensor 40, and therefore the power generation device 33 suspends power generation. Hence, more current than is necessary is not output to the storage cell 12.

According to this embodiment, the dummy current control switch 53 thus suspends dummy current once charging of the storage cell 12 is complete, making it possible to prevent the power generation device 33 from generating more power than necessary.

As illustrated in FIGS. 1 to 6, the current sensor 40 is preferably disposed in the power control device 20 at a location through which current due to power generation by the power generation device 33 during independent operation does not flow. The reason is that if the current sensor 40 is disposed at a location through which current due to power generation by the power generation device 33 flows, the dummy current for causing the power generation device 33 to generate power needs to be output at a higher power than the current due to this power generation, which would increase power consumption related to the dummy current. In other words, by disposing the current sensor 40 at a location in the power control device 20 through which current due to power generation by the power generation device 33 during independent operation does not flow, power consumption related to the dummy current can be reduced.

Much of the subject matter in this disclosure is indicated as a series of operations executed either by a computer system that can execute program instructions or by other hardware. Examples of a computer system and other hardware include a versatile computer, a personal computer (PC), a dedicated computer, a workstation, a Personal Communications System (PCS), a cellular phone, a cellular phone provided with a data processing function, an RFID receiver, a game console, an electronic notepad, a laptop computer, a Global Positioning System (GPS) receiver, or other programmable data processing device. In one embodiment, a variety of operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of a microprocessor, central processing unit (CPU), Application Specific Integrated Circuit (ASIC), Digital Signal Processor (DSP), Programmable Logic Device (PLD), Field Programmable Gate Array (FPGA), processor, controller, microcontroller, microprocessor, electronic device, other device designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

While the disclosed system has a variety of modules and/or units for implementing particular functions, these modules and units have only been indicated schematically in order to briefly illustrate the functionality thereof. It should be noted that no particular hardware and/or software is indicated. In this sense, it suffices for the modules, units, and other constituent elements to be hardware and/or software implemented so as to substantially execute the particular functions described here. The various functions or different constituent elements may be combined with or separated from hardware and/or software in any way, and each may be used individually or in some combination. An input/output (I/O) device or user interface including, but not limited to, a keyboard, display, touchscreen, pointing device, or the like may be connected to the system directly or via an I/O controller. In this way, the various subject matter disclosed herein may be embodied in a variety of forms, and all such embodiments are included in the scope of the subject matter in this disclosure.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the members, units, steps, and the like may be reordered in any logically consistent way. Furthermore, units, steps, and the like may be combined into one or divided.

REFERENCE SIGNS LIST

11 Photovoltaic cell
12 Storage cell
20 Power control device
21 Inverter
22, 23 Interconnected operation switch
24 Independent operation switch
25 Controller
31 Distribution board
32 Load
33 Power generation device
40 Current sensor
50 Dummy output system (output unit)
51 Dummy current load
52 Synchronous switch

The invention claimed is:

1. A power control system comprising:
a power control device configured to obtain, from a current sensor, a power flow between a power grid and a load, wherein the power control device has an output unit to output power to the load;
a dummy output system configured to receive power from the power control device;
a first power source configured to generate power while the power control device obtains a forward power flow flowing from the power grid to the load; and
a second power source configured to generate power, wherein the power control device, while the first power source and the second power source are disconnected from the power grid, outputs the power from the second power source to the load, and controls the dummy output system to provide a dummy current flowing in a direction of the forward power flow to the current sensor.

2. The power control system of claim 1, further comprising a synchronous switch configured to switch synchronously with connection to and disconnection from the grid, wherein the synchronous switch passes the dummy current when disconnected from the grid and does not pass the dummy current when connected to the grid.

3. The power control system of claim 1, further comprising an independent operation switch configured to turn off during interconnected operation and turn on during independent operation via the distributed power source, wherein the independent operation switch is disposed between the power generation device and the other distributed power source.

4. The power control system of claim 3, wherein the other distributed power source is a storage cell capable of charging with power from the power generation device when the independent operation switch is on.

5. The power control system of claim 4, further comprising a dummy current control switch configured to suspend the dummy current upon completion of the charging of the storage cell.

6. The power control system of claim 1, wherein the current sensor is disposed at a location through which current due to power generation by the power generation device during independent operation does not flow.

7. A power control device used in a power control system, wherein the power control system comprises a dummy output system configured to receive power from the power control device, a first power source configured to generate power while the power control device obtains a forward power flow flowing from a power grid to a load, and a second power source configured to generate power, the power control device comprising:

an output unit to output power to the load; and a controller that
obtains, from a current sensor, a power flow between the power grid and the load, and,
while the first power source and the second power source are disconnected from the power grid, output power from the second power source to the load, and control the dummy output system to provide a dummy current flowing in a direction of the forward power flow to the current sensor.

8. A method for controlling a power control system, wherein the power control system comprises a dummy output system configured to receive power from a power control device, a first power source configured to generate power while the power control device obtains a forward power flow flowing from a power grid to a load, and a second power source configured to generate power, the method comprising, by the power control device:

obtaining, from a current sensor, a power flow between the power grid and the load; and,
while the first power source and the second power source are disconnected from the power grid, outputting power from the second power source to the load, and controlling the dummy output system to provide a dummy current flowing in a direction of the forward power flow to the current sensor.

9. The power control system of claim 1, wherein the power control device comprises the dummy output system.

10. The power control device of claim 7, wherein the power control device comprises the dummy output system.

11. The method of claim 8, wherein the power control device comprises the dummy output system.

* * * * *